US011908423B2

(12) United States Patent
Chung et al.

(10) Patent No.: US 11,908,423 B2
(45) Date of Patent: Feb. 20, 2024

(54) DISPLAY DEVICE AND METHOD OF DRIVING THE SAME

(71) Applicant: Samsung Display Co., Ltd., Yongin-si (KR)

(72) Inventors: Boyong Chung, Suwon-si (KR); Jonghee Kim, Yongin-si (KR); Hyuk Kim, Suwon-si (KR); Joosun Yoon, Seoul (KR); Tak-Young Lee, Anyang-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 17/864,764

(22) Filed: Jul. 14, 2022

(65) Prior Publication Data

US 2023/0178031 A1 Jun. 8, 2023

(30) Foreign Application Priority Data

Dec. 6, 2021 (KR) ........................ 10-2021-0173179

(51) Int. Cl.

*G09G 3/3291* (2016.01)
*G09G 3/3266* (2016.01)
*G09G 3/3275* (2016.01)
*G09G 3/3258* (2016.01)

(52) U.S. Cl.

CPC ......... *G09G 3/3291* (2013.01); *G09G 3/3266* (2013.01); *G09G 3/3275* (2013.01); *G09G 3/3258* (2013.01); *G09G 2310/0272* (2013.01); *G09G 2330/025* (2013.01);

(Continued)

(58) Field of Classification Search

CPC .. G09G 3/3291; G09G 3/3266; G09G 3/3275; G09G 3/3258; G09G 2310/0272; G09G 2330/028; G09G 2330/027; G09G 2330/026; G09G 2330/025

See application file for complete search history.

(56) References Cited

U.S. PATENT DOCUMENTS

2008/0129903 A1* 6/2008 Hong .................. G09G 3/3648 349/36
2014/0092144 A1* 4/2014 Kim .................... G09G 3/3233 345/76

(Continued)

FOREIGN PATENT DOCUMENTS

KR 100747684 B1 8/2007
KR 1020160032740 A 3/2016

(Continued)

*Primary Examiner* — Nitin Patel
*Assistant Examiner* — Saifeldin E Elnafia
(74) *Attorney, Agent, or Firm* — CANTOR COLBURN LLP

(57) ABSTRACT

A display device includes a display panel including a plurality of pixels, a gate driver which provides a gate signal to corresponding pixels of the plurality of pixels, a data driver which provides a data voltage to the corresponding pixels of the plurality of pixels, a power voltage generator which provides a pixel power voltage to each of the plurality of pixels, and provides a gate power voltage to the gate driver, and a controller which provides a gate control signal to the gate driver. The pixel power voltage, the data voltage, and the gate control signal sequentially have a ground voltage level in response to a power-off signal.

20 Claims, 8 Drawing Sheets

(52) U.S. Cl.
CPC . *G09G 2330/026* (2013.01); *G09G 2330/027* (2013.01); *G09G 2330/028* (2013.01)

(56) References Cited

U.S. PATENT DOCUMENTS

| | | | | |
|---|---|---|---|---|
| 2015/0009198 | A1* | 1/2015 | Park | G09G 3/3291 345/212 |
| 2015/0269900 | A1* | 9/2015 | Iwamoto | G09G 3/3648 345/100 |
| 2016/0078818 | A1* | 3/2016 | Kang | G09G 3/3291 323/280 |
| 2018/0158414 | A1* | 6/2018 | Lee | G09G 3/3233 |

FOREIGN PATENT DOCUMENTS

| | | | |
|---|---|---|---|
| KR | 1020170049735 | A | 5/2017 |
| KR | 1020170087119 | A | 7/2017 |
| KR | 1020190119243 | A | 10/2019 |

* cited by examiner

GCS:SCCK,SSCK,CRCK

DISPLAY DEVICE AND METHOD OF DRIVING THE SAME

This application claims priority to Korean Patent Application No. 10-2021-0173179, filed on Dec. 6, 2021, and all the benefits accruing therefrom under 35 U.S.C. § 119, the content of which in its entirety is herein incorporated by reference.

BACKGROUND

1. Field

Embodiments relate to a display device. More particularly, embodiments related to a display device applied to various electronic apparatuses and a method of driving the display device.

2. Description of the Related Art

A display device may include a display panel for displaying an image and a driver for driving the display panel. The driver may include a gate driver providing a gate signal to the display panel, a data driver providing a data voltage to the display panel, and a power voltage generator providing a power voltage to the display panel and the gate driver.

SUMMARY

A display device may block signals and voltages provided to a display panel and a driver after shutdown or power-off, and accordingly, an image display may be stopped.

Embodiments provide a display device in which a display defect is prevented.

Embodiments provide a method of driving a display device for preventing a display defect.

A display device in an embodiment includes a display panel including a plurality of pixels, a gate driver which provides a gate signal to corresponding pixels of the plurality of pixels, a data driver which provides a data voltage to the corresponding pixels of the plurality of pixels, a power voltage generator which provides a pixel power voltage to each of the plurality of pixels, and provides a gate power voltage to the gate driver, and a controller which provides a gate control signal to the gate driver. The pixel power voltage, the data voltage, and the gate control signal sequentially have a ground voltage level in response to a power-off signal.

In an embodiment, the pixel power voltage may include a first power voltage and a second power voltage having a voltage level lower than a voltage level of the first power voltage after a power-on. The second power voltage may have the ground voltage level after the first power voltage has the ground voltage level in response to the power-off signal.

In an embodiment, the first power voltage may gradually decrease from a normal voltage level to the ground voltage level in response to the power-off signal.

In an embodiment, the first power voltage may decrease to the ground voltage level after the first power voltage decreases to a voltage level between the normal voltage level and the ground voltage level in response to the power-off signal.

In an embodiment, a time interval between a time point at which the data voltage has the ground voltage level and a time point at which the gate control signal has the ground voltage level may be at least one frame time.

In an embodiment, the gate control signal and the gate power voltage may substantially simultaneously have the ground voltage level in response to the power-off signal.

In an embodiment, the gate control signal, the data voltage, and the pixel power voltage may sequentially have a normal voltage level in response to a power-on signal.

In an embodiment, the pixel power voltage may include a first power voltage and a second power voltage having a voltage level lower than a voltage level of the first power voltage after a power-on. The first power voltage may have the normal voltage level after the second power voltage has the normal voltage level in response to the power-on signal.

In an embodiment, the first power voltage may gradually increase from the ground voltage level to the normal voltage level in response to the power-on signal.

In an embodiment, the first power voltage may increase to the normal voltage level after the first power voltage increases to a voltage level between the ground voltage level and the normal voltage level in response to the power-on signal.

In an embodiment, the gate control signal and the data voltage may substantially simultaneously have the ground voltage level in response to a shutdown signal.

In an embodiment, the gate control signal, the data voltage, and the gate power voltage may substantially simultaneously have the ground voltage level in response to the shutdown signal.

In an embodiment, the gate control signal may include a plurality of clock signals and a plurality of control signals.

In an embodiment, the gate power voltage may include a plurality of power voltages.

A method of driving a display device in an embodiment includes controlling a pixel power voltage provided to a plurality of pixels from a power voltage generator to have a ground voltage level in response to a power-off signal, controlling a data voltage provided to corresponding pixels of the plurality of pixels from a data driver to have the ground voltage level after the pixel power voltage has the ground voltage level, and controlling a gate control signal provided to a gate driver from a controller to have the ground voltage level after the data voltage has the ground voltage level.

In an embodiment, the pixel power voltage may include a first power voltage and a second power voltage having a voltage level lower than a voltage level of the first power voltage after a power-on. The controlling the pixel power voltage to have the ground voltage level may include controlling the first power voltage to have the ground voltage level in response to the power-off signal, and controlling the second power voltage to have the ground voltage level after the first power voltage has the ground voltage level.

In an embodiment, the first power voltage may gradually decrease from a normal voltage level to the ground voltage level in response to the power-off signal.

In an embodiment, a time interval between a time point at which the data voltage has the ground voltage level and a time point at which the gate control signal has the ground voltage level may be at least one frame time.

In an embodiment, the method may further include controlling the gate control signal to have a normal voltage level in response to a power-on signal, controlling the data voltage to have the normal voltage level after the gate control signal has the normal voltage level, and controlling the pixel power voltage to have the normal voltage level after the data voltage has the normal voltage level.

In an embodiment, the method may further include controlling the gate control signal and the data voltage to substantially simultaneously have the ground voltage level in response to a shutdown signal.

In the display device and the method of driving the display device in the embodiments, the pixel power voltage, the data voltage, and the gate control signal may sequentially have the ground voltage level in response to the power-off signal, so that an unpredicted image may not be displayed after the power-off.

Further, the gate control signal and the data voltage may substantially simultaneously have the ground voltage level in response to the shutdown signal, so that an unpredicted image may not be displayed after the shutdown.

BRIEF DESCRIPTION OF THE DRAWINGS

Illustrative, non-limiting embodiments will be more clearly understood from the following detailed description taken in conjunction with the accompanying drawings.

FIG. 7 is a waveform diagram illustrating an embodiment of signals and voltages before and after power-on.

DETAILED DESCRIPTION

Figure 1:
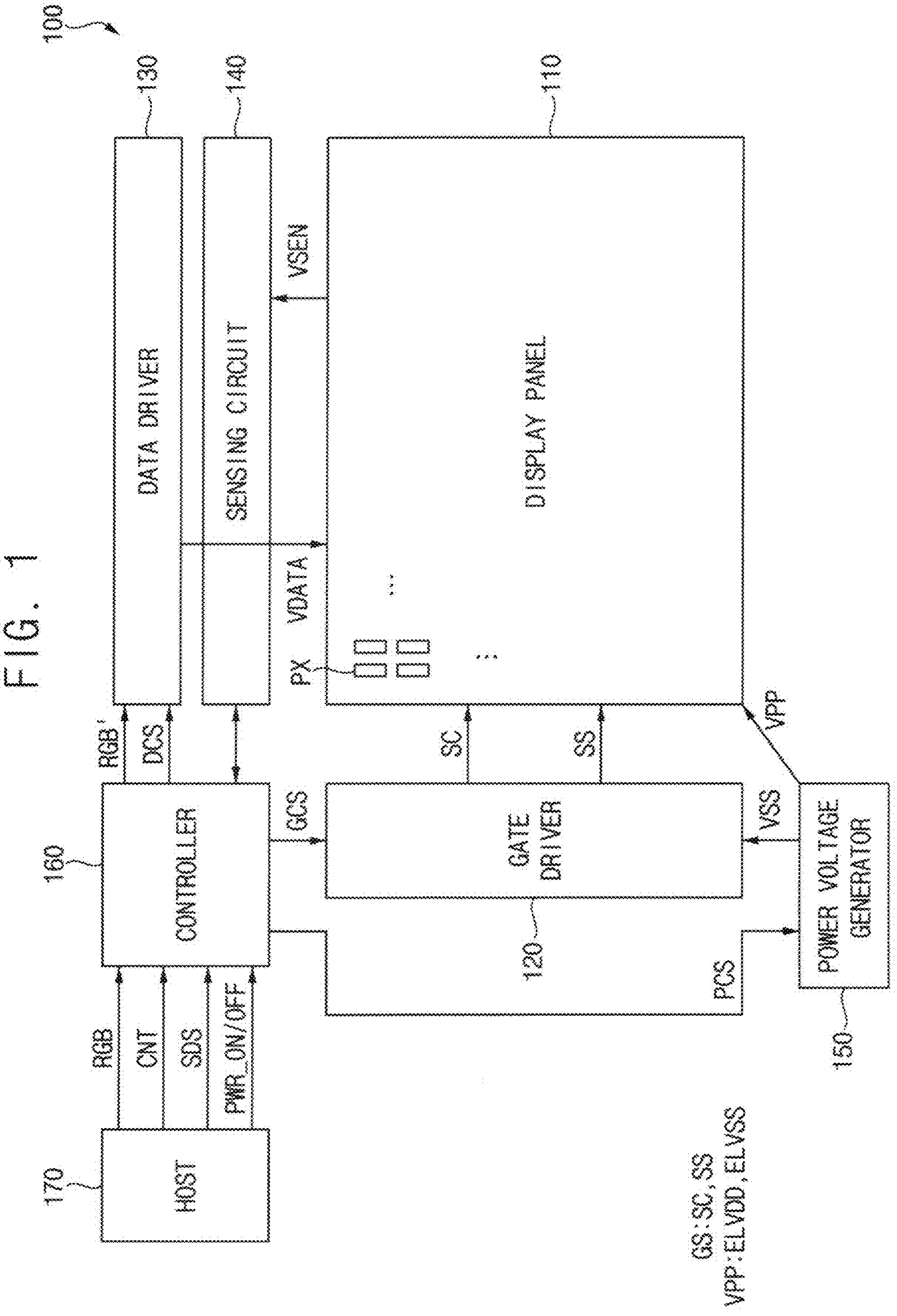
FIG. 1 is a block diagram illustrating an embodiment of a display device.

Hereinafter, display devices and methods of driving display devices in embodiments will be explained in detail with reference to the accompanying drawings.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

FIG. 1 is a block diagram illustrating an embodiment of a display device 100.

Referring to FIG. 1, the display device 100 may include a display panel 110, a gate driver 120, a data driver 130, a sensing circuit 140, a power voltage generator 150, and a controller 160. The display device 100 may further include a host 170.

The display panel 110 may display an image. The display panel 110 may include a plurality of pixels PX. The pixels PX may be arranged in a substantially matrix form, and accordingly, the pixels PX may define pixel rows and pixel columns. However, the invention is not limited thereto, and the pixels PX may be arranged in various other shapes. Each of the pixels PX may emit light, and the display panel 110 may display an image in which the lights are combined. In an embodiment, each of the pixels PX may emit at least one of red, green, blue, and white light. However, the invention is not limited thereto, and each of the pixels PX may emit various other color lights.

The gate driver 120 may generate a gate signal GS based on a gate control signal GCS and a gate power voltage VSS. The gate driver 120 may provide the gate signal GS to corresponding pixels (e.g., pixels in the same row) of the pixels PX. The gate driver 120 may sequentially provide gate signals GS to the pixel rows, respectively.

In an embodiment, the gate signal GS may include a scan signal SC and a sensing signal SS.

The data driver 130 may generate a data voltage VDATA based on a data control signal DCS and output image data RGB'. The data driver 130 may provide the data voltage VDATA to the corresponding pixels of the pixels PX. The data driver 130 may provide the data voltage VDATA to a pixel row selected by the scan signal SC.

The sensing circuit 140 may receive a sensing voltage VSEN or a sensing current from the pixels PX. The sensing circuit 140 may measure degradation information of the pixels PX through the sensing voltage VSEN or the sensing current. In an embodiment, the degradation information of the pixels PX may include mobilities of driving transistors, threshold voltages of the driving transistors, threshold voltages of light-emitting elements, or the like, for example.

In an embodiment, the data driver 130 and the sensing circuit 140 may be configured as a driving chip. In other words, the driving chip may include the data driver 130 and the sensing circuit 140.

The power voltage generator 150 may generate a pixel power voltage VPP and a gate power voltage VSS based on a power voltage control signal PCS. The power voltage generator 150 may provide the pixel power voltage VPP to each of the pixels PX. Further, the power voltage generator 150 may provide the gate power voltage VSS to the gate driver 120.

In an embodiment, the pixel power voltage VPP may include a first power voltage ELVDD and a second power voltage ELVSS. A voltage level of the second power voltage ELVSS may be lower than a voltage level of the first power voltage ELVDD after power-on.

The controller 160 may control a driving of the gate driver 120, a driving of the data driver 130, and a driving of the power voltage generator 150. The controller 160 may receive input image data RGB, a control signal CNT, a shutdown signal SDS, and a power-on/off signal PWR_ON/OFF from the host 170.

The shutdown signal SDS may be a signal activated when the display device 100 operates in a shutdown mode. The shutdown mode may mean a case in which the display device 100 needs to be turned off urgently. The power-on/off signal PWR_ON/OFF may be a signal activated when the display device 100 is turned on or off.

The controller 160 may generate the gate control signal GCS based on the control signal CNT, the shutdown signal SDS, and the power-on/off signal PWR_ON/OFF, and may provide the gate control signal GCS to the gate driver 120. The controller 160 may generate the data control signal DCS based on the input image data RGB, the control signal CNT, the shutdown signal SDS, and the power-on/off signal PWR_ON/OFF, and may provide the data control signal DCS to the data driver 130. The controller 160 may generate the power voltage control signal PCS based on the control signal CNT, the shutdown signal SDS, and the power-on/off signal PWR_ON/OFF, and may provide the power voltage control signal PCS to the power voltage generator 150.

Figure 2:
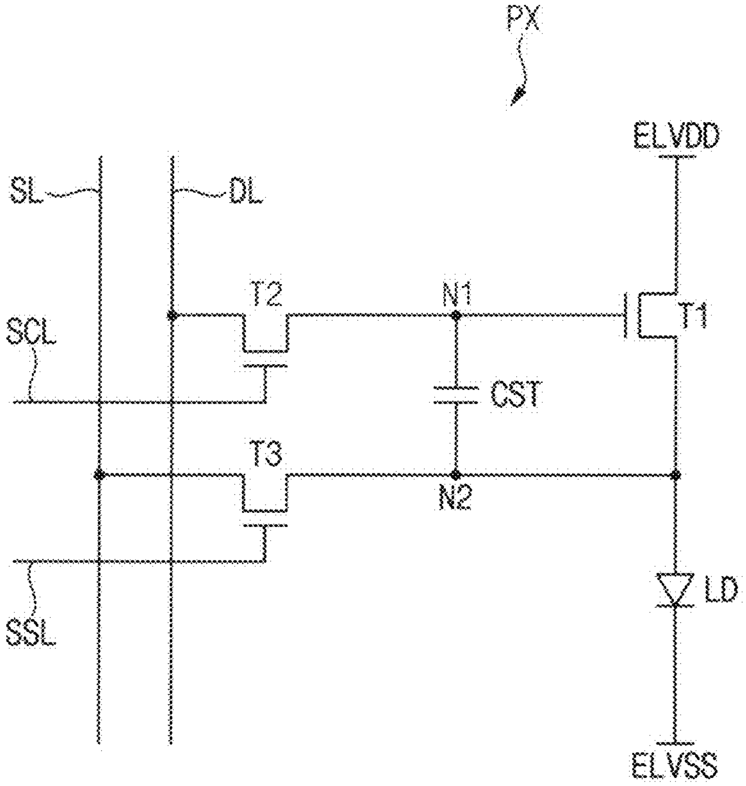
FIG. 2 is a circuit diagram illustrating a pixel included in the display device in FIG. 1.

FIG. 2 is a circuit diagram illustrating the pixel PX included in the display device 100 in FIG. 1.

Referring to FIGS. 1 and 2, in an embodiment, the pixel PX may include a first transistor T1, a second transistor T2, a third transistor T3, a storage capacitor CST, and a light-emitting element LD.

A first electrode of the first transistor T1 may receive the first power voltage ELVDD, and a second electrode of the first transistor T1 may be connected to a second node N2. A gate electrode of the first transistor T1 may be connected to a first node N1. The first transistor T1 may be also referred to as a driving transistor.

A first electrode of the second transistor T2 may be connected to a data line DL that transmits the data voltage VDATA, and a second electrode of the second transistor T2 may be connected to the first node N1. A gate electrode of the second transistor T2 may be connected to a scan line SCL that transmits the scan signal SC. The second transistor T2 may be also referred to as a switching transistor, a scan transistor, or the like.

A first electrode of the third transistor T3 may be connected to a sensing line SL that transmits an initialization voltage and the sensing voltage VSEN or the sensing current, and a second electrode of the third transistor T3 may be connected to the second node N2. A gate electrode of the third transistor T3 may be connected to a sensing control line SSL that transmits the sensing signal SS. The third transistor T3 may be also referred to as an initialization transistor, a sensing transistor, or the like.

In an embodiment, as illustrated in FIG. 2, each of the first transistor T1, the second transistor T2, and the third transistor T3 may be an N-type transistor. In another embodiment, at least one of the first transistor T1, the second transistor T2, and the third transistor T3 may be a P-type transistor.

A first electrode of the storage capacitor CST may be connected to the first node N1, and a second electrode of the storage capacitor CST may be connected to the second node N2.

A first electrode of the light-emitting element LD may be connected to the second node N2, and a second electrode of the light-emitting element LD may receive the second power voltage ELVSS. In an embodiment, the light-emitting element LD may be an organic light-emitting diode. In another embodiment, the light-emitting element LD may be an inorganic light-emitting diode or a quantum dot light-emitting diode.

FIG. 2 illustrates an embodiment in which the pixel PX includes three transistors and one capacitor, however, the invention is not limited thereto. In another embodiment, the pixel PX may include two, or four or more transistors and/or two or more capacitors.

Figure 3:
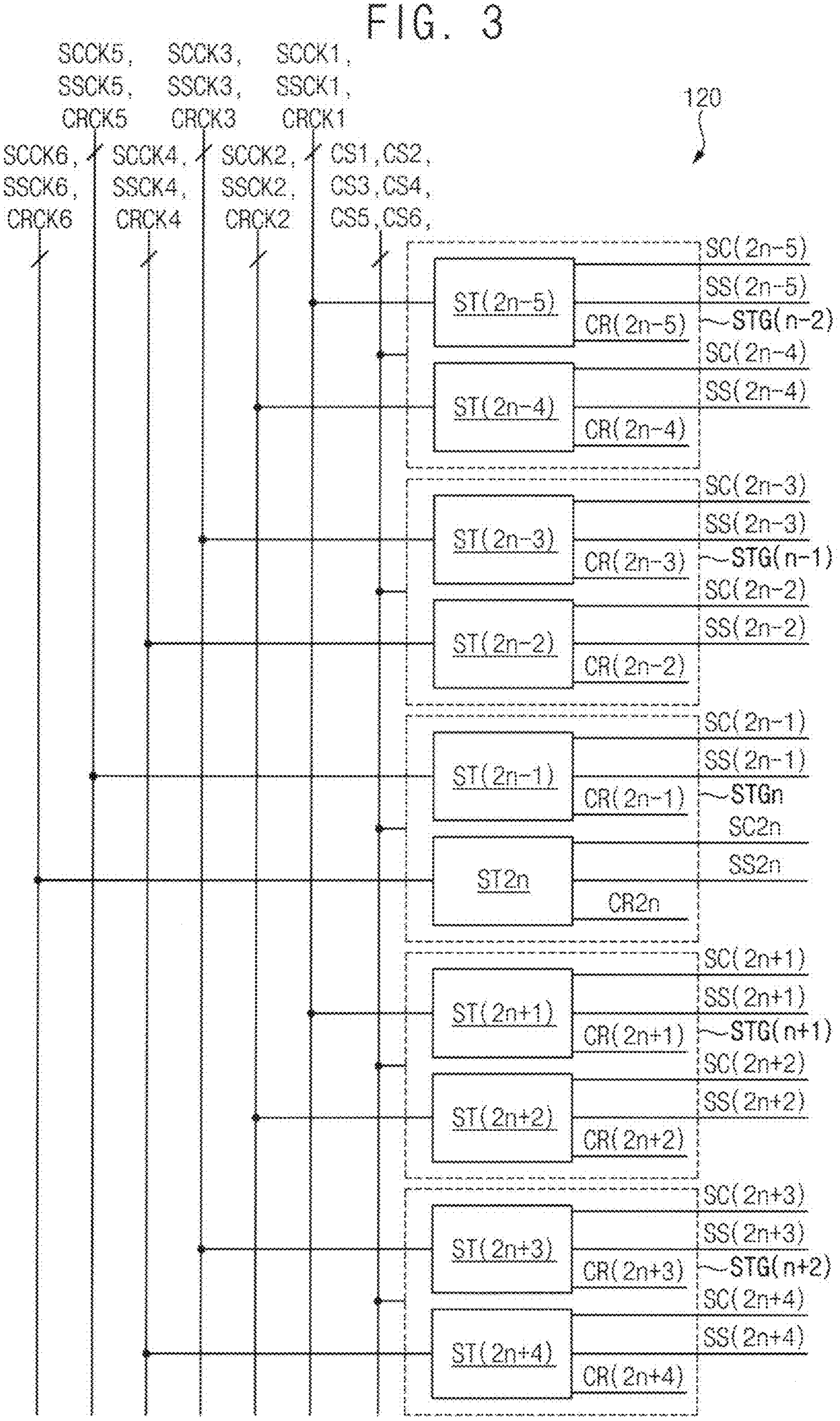
FIG. 3 is a block diagram illustrating a gate driver included in the display device in FIG. 1.

FIG. 3 is a block diagram illustrating the gate driver 120 included in the display device 100 in FIG. 1. FIG. 3 illustrates only a portion of the gate driver 120 for convenience of description.

Referring to FIGS. 1 and 3, the gate driver 120 may include a plurality of stage groups STG(n−2), STG(n−1), STGn, STG(n+1), and STG(n+2). The gate driver 120 may receive the gate control signal GCS and the gate power voltage VSS, and may output scan signals SC(2*n*−5), SC(2*n*−4), . . . , SC(2*n*+3), and SC(2*n*+4), sensing signals SS(2*n*−5), SS(2*n*−4), . . . , SS(2*n*+3), and SS(2*n*+4), and carry signals CR(2n−5), CR(2n−4), . . . , CR(2n+3), and CR(2n+4). Here, n may be a natural number greater than two.

The gate control signal GCS may include a plurality of clock signals and a plurality of control signals. In an embodiment, the clock signals may include first to sixth scan clock signals SCCK1, SCCK2, SCCK3, SCCK4, SCCK5, and SCCK6, first to sixth sensing clock signals SSCK1, SSCK2, SSCK3, SSCK4, SSCK5, and SSCK6, and first to sixth carry clock signals CRCK1, CRCK2, CRCK3, CRCK4, CRCK5, and CRCK6. In an embodiment, the control signals may include first to sixth control signals CS1, CS2, CS3, CS4, CS5, and CS6.

Each of the stage groups STG(n−2), STG(n−1), STGn, STG(n+1), and STG(n+2) may include a first stage and a second stage. In an embodiment, the first stage may be an odd-numbered stage, and the second stage may be an even-numbered stage. In another embodiment, the first stage may be an even-numbered stage, and the second stage may be an odd-numbered stage.

In an embodiment, an (n−2)$^{th}$ stage group STG(n−2) may include a first stage ST(2n−5) and a second stage ST(n−4), an (n−1)$^{th}$ stage group STG(n−1) may include a first stage ST(n−3) and a second stage ST(n−2), and an n$^{th}$ stage group STGn may include a first stage ST(n−1) and a second stage ST2n. Further, an (n+1)$^{th}$ stage group STG(n+1) may include a first stage ST(n+1) and a second stage ST(n+2), and an (n+2)$^{th}$ stage group STG(n+2) may include a first stage ST(n+3) and a second stage ST (2n+4), for example.

Each of the stage groups STG(n−2), STG(n−1), STGn, STG(n+1), and STG(n+2) may receive the first to sixth control signals CS1, CS2, CS3, CS4, CS5, and CS6.

Each of the stages ST(n−5), ST(n−4), . . . , ST(n+3), and ST(n+4) may receive a corresponding scan clock signal among the first to sixth scan clock signals SCCK1, SCCK2, SCCK3, SCCK4, SCCK5, and SCCK6, a corresponding sensing clock signal among the first to sixth sensing clock signals SSCK1, SSCK2, SSCK3, SSCK4, SSCK5, and SSCK6, and a corresponding carry clock signal among the first to sixth carry clock signals CRCK1, CRCK2, CRCK3, CRCK4, CRCK5 and CRCK6.

In an embodiment, the first stage ST(n−5) may receive the first scan clock signal SCCK1, the first sensing clock signal SSCK1, and the first carry clock signal CRCK1, and the second stage ST(n−4) may receive the second scan clock signal SCCK2, the second sensing clock signal SSCK2, and the second carry clock signal CRCK2, for example. The first stage ST(n−3) may receive the third scan clock signal SCCK3, the third sensing clock signal SSCK3, and the third carry clock signal CRCK3, and the second stage ST(n−2) may receive the fourth scan clock signal SCCK4, the fourth sensing clock signal SSCK4, and the fourth carry clock signal CRCK4. The first stage ST(n−1) may receive the fifth scan clock signal SCCK5, the fifth sensing clock signal SSCK5, and the fifth carry clock signal CRCK5, and the second stage ST2n may receive the sixth scan clock signal SCCK6, the sixth sensing clock signal SSCK6, and the sixth carry clock signal CRCK6.

Further, iteratively, the first stage ST(2n+1) may receive the first scan clock signal SCCK1, the first sensing clock signal SSCK1, and the first carry clock signal CRCK1, and the second stage ST(2n+2) may receive the second scan clock signal SCCK2, the second sensing clock signal SSCK2, and the second carry clock signal CRCK2. The first stage ST(2n+3) may receive the third scan clock signal SCCK3, the third sensing clock signal SSCK3, and the third carry clock signal CRCK3, and the second stage ST (2n+4) may receive the fourth scan clock signal SCCK4, the fourth sensing clock signal SSCK4, and the fourth carry clock signal CRCK4.

Each of the stages ST(2n−5), ST(2n−4), . . . , ST(2n+3), and ST(2n+4) may output a corresponding scan signal among the scan signals SC(2n−5), SC(2n−4), . . . , SC(2n+3), and SC(2n+4)), a corresponding sensing signal among the sensing signals SS(2n−5), SS(2n−4), . . . , SS(2n+3), and SS(2n+4), and a corresponding carry signal among the carry signals CR(2n−5), CR(2n−4), . . . , CR(2n+3), and CR(2n+4).

In an embodiment, the first stage ST(2n−5) may output a scan signal SC(2n−5), a sensing signal SS(2n−5), and a carry signal CR(2n−5), and the second stage ST(2n−4) may output a scan signal SC(2n−4), a sensing signal SS(2n−4), and a carry signal CR(2n−4), for example. The first stage ST(2n−3) may output a scan signal SC(2n−3), a sensing signal SS(2n−3), and a carry signal CR(2n−3), and the second stage ST(2n−2) may output a scan signal SC(2n−2), a sensing signal SS(2n−2), and a carry signal CR(2n−2). The first stage ST(2n−1) may output a scan signal SC(2n−1), a sensing signal SS(2n−1), and a carry signal CR(2n−1), and the second stage ST2n may output a scan signal SC2n, a sensing signal SS2n, and a carry signal CR2n. The first stage ST(2n+1) may output a scan signal SC(2n+1), a sensing signal SS(2n+1), and a carry signal CR(2n+1), and the second stage ST(2n+2) may output a scan signal SC(2n+2), a sensing signal SS(2n+2), and a carry signal CR(2n+2). The first stage ST(2n+3) may output a scan signal SC(2n+3), a sensing signal SS(2n+3), and a carry signal CR(2n+3), and the second stage ST(2n+4) may output a scan signal SC(2n+4), a sensing signal SS(2n+4), and a carry signal CR(2n+4), for example.

Figure 4:
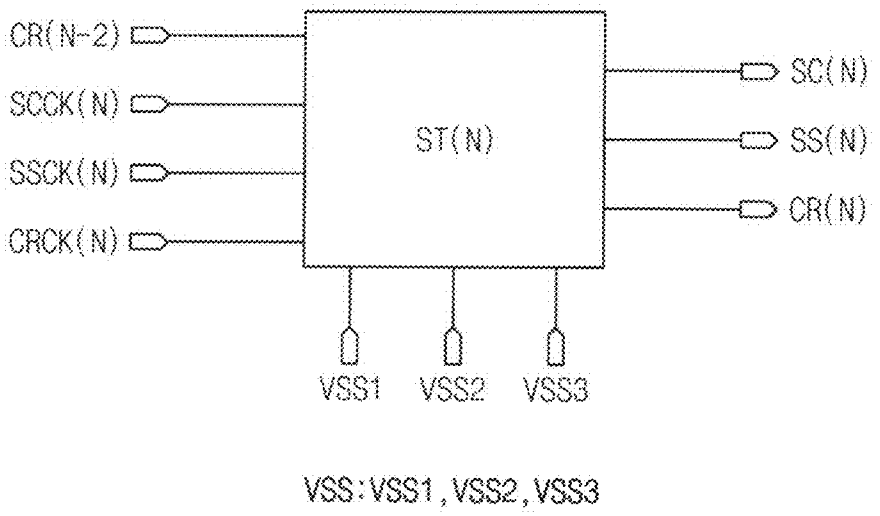
FIG. 4 is a block diagram illustrating a stage included in the gate driver in FIG. 3.

FIG. 4 is a block diagram illustrating a stage included in the gate driver 120 in FIG. 3. FIG. 4 illustrates an embodiment of an N$^{th}$ stage ST(N) among the stages ST(2n−5), ST(2n−4), . . . , ST(2n+3), and ST(2n+4) included in the gate driver 120 in FIG. 3, for example. Here, Here, n may be a natural number equal to or greater than one.

Referring to FIGS. 1, 3, and 4, the stage ST(N) may receive a carry signal CR(N−2), a scan clock signal SCCK (N), a sensing clock signal SSCK(N), and a carry clock signal CRCK(N), and may output a scan signal SC(N), a sensing signal SS(N), and a carry signal CR(N). Further, the stage ST(N) may receive the gate power voltage VSS.

In an embodiment, the gate power voltage VSS may include a plurality of power voltages. In an embodiment, the gate power voltage VSS may include a first gate power voltage VSS1, a second gate power voltage VSS2, and a third gate power voltage VSS3, for example.

In an embodiment, the carry signal CR(N−2) received by the N$^{th}$ stage ST(N) may be a carry signal output from the (N−2)$^{th}$ stage. In such an embodiment, the carry signal CR(N) output from the N$^{th}$ stage ST(N) may be a carry signal received from the (N+2)$^{th}$ stage.

Figure 5:
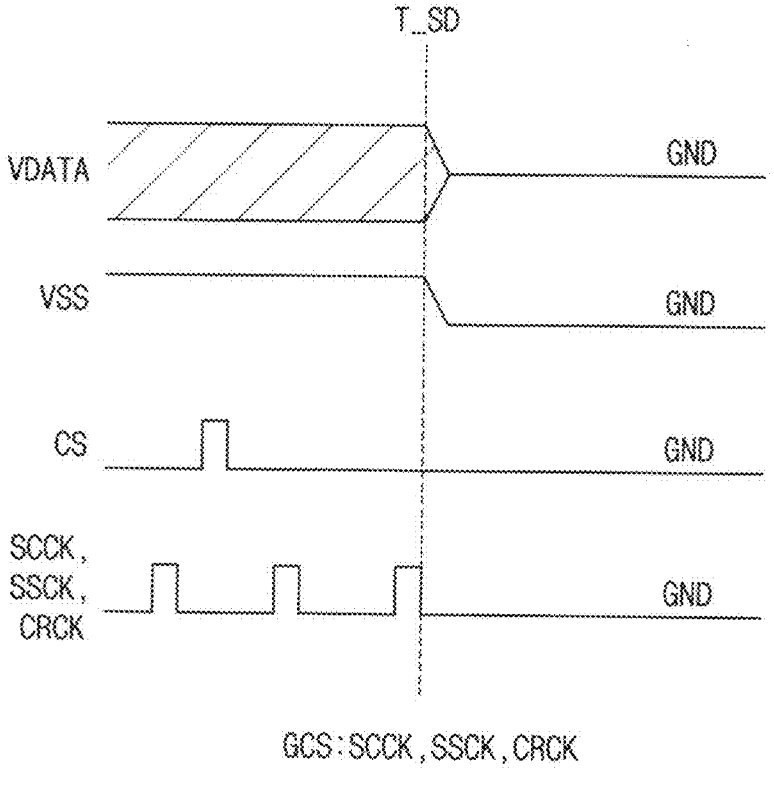
FIG. 5 is a waveform diagram illustrating an embodiment of signals and voltages before and after shutdown.

FIG. 5 is a waveform diagram illustrating an embodiment of signals and voltages before and after shutdown. Hereinafter, in FIGS. 5, 7, and 8, a control signal CS represents one of the first to sixth control signals CS1, CS2, CS3, CS4, CS5, and CS6 in FIG. 3, a scan clock signal SCCK represents one of the first to sixth scan clock signals SCCK1, SCCK2, SCCK3, SCCK4, SCCK5, and SCCK6 in FIG. 3, a sensing clock signal SSCK represents one of the first to sixth sensing clock signals SSCK1, SSCK2, SSCK3, SSCK4, SSCK5, and SSCK6 in FIG. 3, and a carry clock signal CRCK represents one of the first to sixth carry clock signals CRCK1, CRCK2, CRCK3, CRCK4, CRCK5, and CRCK6.

Referring to FIGS. 1 and 5, the gate control signal GCS including the clock signals SCCK1-SCCK6, SSCK1-SSCK6, and CRCK1-CRCK6 and the control signals CS1-CS6, the data voltage VDATA, and the gate power voltage VSS may substantially simultaneously have a ground voltage level GND in response to the shutdown signal SDS at a shutdown time point T_SD.

Before the shutdown time point T_SD, each of the gate control signal GCS, the data voltage VDATA, and the gate power voltage VSS may have a normal voltage level. The normal voltage level may be a voltage level of each of the gate control signal GCS, the data voltage VDATA, and the gate power voltage VSS for normally operating the display device 100.

When the shutdown signal SDS is activated at the shutdown time point T_SD, the gate control signal GCS, the data voltage VDATA, and the gate power voltage VSS may substantially simultaneously have the ground voltage level GND in response to the shutdown signal SDS. The controller 160 may provide the gate control signal GCS having the ground voltage level GND to the gate driver 120 in response to the activated shutdown signal SDS. Further, the controller 160 may provide the data control signal DCS and the power voltage control signal PCS to the data driver 130 and the power voltage generator 150 in response to the activated shutdown signal SDS, respectively. The data driver 130 may provide the data voltage VDATA having the ground voltage level GND to each of the pixels PX based on the data control signal DCS, and the power voltage generator 150 may provide the gate power voltage VSS having the ground voltage level GND to the gate driver 120 based on the power voltage control signal PCS.

Figure 6:
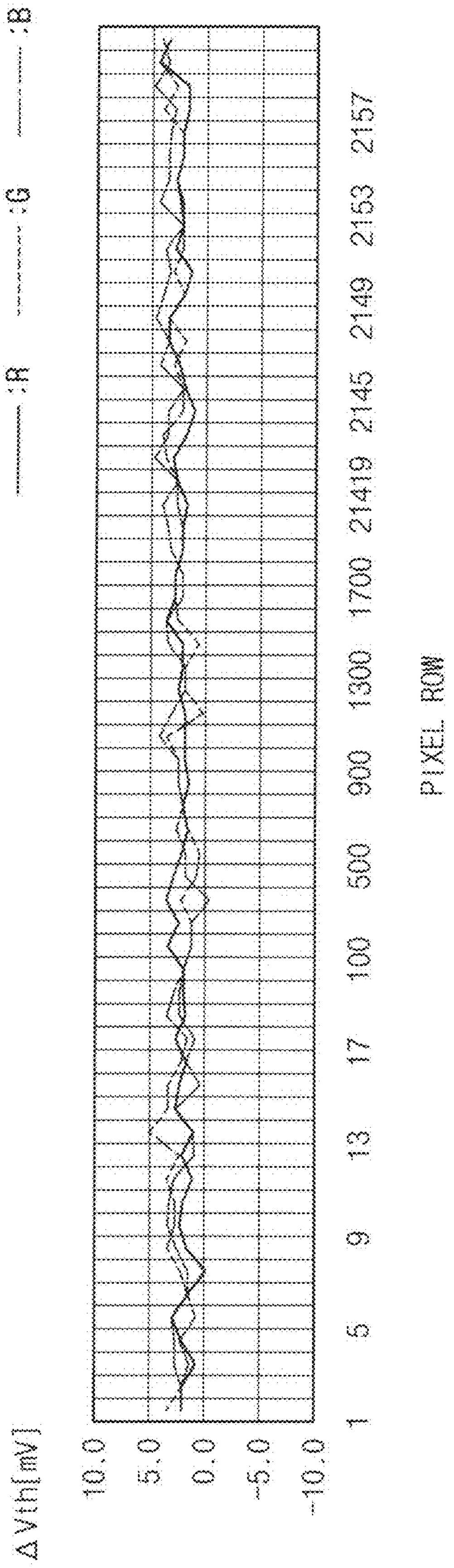
FIG. 6 is a graph illustrating an embodiment of shift amounts of threshold voltages of first transistors after the shutdown.

FIG. 6 is a graph illustrating shift amounts ΔVth of threshold voltages of the first transistors T1 after the shutdown.

Referring to FIG. 6, shift amounts ΔVth of threshold voltages of the first transistors T1 (refer to FIG. 2) respectively included in the pixel rows of the display panel 110 (refer to FIG. 1) after the shutdown may be relatively uniform and small. Most of the shift amounts ΔVth of the threshold voltages of the first transistors T1 may be about 0 millivolt (mV) to about 5 mV.

In a comparative example of the prior art, after the shutdown, the gate control signal GCS may have a high voltage level, the gate power voltage VSS may have a low voltage level, and the data voltage VDATA may have a normal voltage level. In this case, the gate signal GS and the data voltage VDATA may be applied to each of some of the pixel rows to turn on the second transistors T2 (refer to FIG. 2) respectively included in the some of the pixel rows. Accordingly, the data voltage VDATA may be applied to the first transistors T1 respectively included in the some of the pixel rows, and shift amounts ΔVth of the threshold voltages of the first transistors T1 may be relatively large. In this case, a display defect in which the some of the pixel rows emit light after the shutdown may occur.

However, in the embodiment of the invention, the gate control signal GCS, the data voltage VDATA, and the gate power voltage VSS may substantially simultaneously have the ground voltage level GND after the shutdown, so that the second transistors T2 respectively included in the pixel rows may be turned off. Accordingly, the data voltage VDATA may not be applied to the first transistors T1 respectively included in the pixel rows, and the shift amounts ΔVth of the threshold voltages of the first transistors T1 may be relatively uniform and small. In this case, a display defect in which some of the pixel rows of the display panel 110 emit light after the shutdown may not occur.

Figure 7:
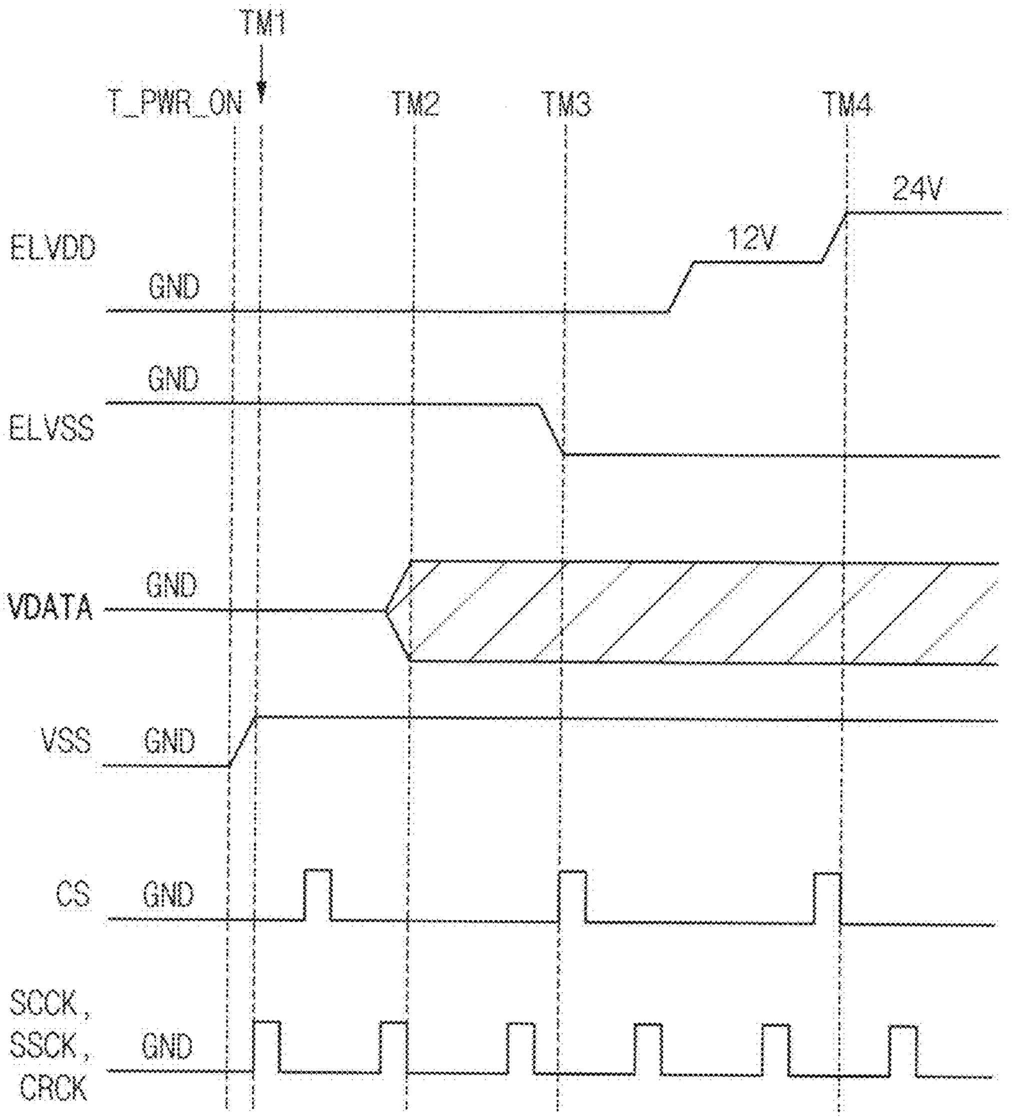

FIG. 7 is a waveform diagram illustrating an embodiment of signals and voltages before and after power-on.

Referring to FIGS. 1 and 7, the gate control signal GCS including the clock signals SCCK1-SCCK6, SSCK1-SSCK6, and CRCK1-CRCK6 and the control signals CS1-CS6, the data voltage VDATA, and the pixel power voltage VPP including the first power voltage ELVDD and the second power voltage ELVSS may sequentially have a normal voltage level in response to the power-on signal PWR_ON at a power-on time point T_PWR_ON. Further, the gate control signal GCS and the gate power voltage VSS may substantially simultaneously have the normal voltage level in response to the power-on signal PWR_ON at the power-on time point T_PWR_ON. The normal voltage level may be a voltage level of each of the gate control signal GCS, the data voltage VDATA, the pixel power voltage VPP, and the gate power voltage VSS for normally operating the display device 100.

In an embodiment, after the second power voltage ELVSS has the normal voltage level in response to the power-on signal PWR_ON, the first power voltage ELVDD may have the normal voltage level. In such an embodiment, the gate control signal GCS, the data voltage VDATA, the second power voltage ELVSS, and the first power voltage ELVDD may sequentially have the normal voltage level in response to the power-on signal PWR_ON. In another embodiment, the first power voltage ELVDD and the second power voltage ELVSS may substantially simultaneously have the normal voltage level in response to the power-on signal PWR_ON.

Before the power-on time point T_PWR_ON, the gate control signal GCS, the gate power voltage VSS, the data voltage VDATA, and the pixel power voltage VPP may have the ground voltage level GND. Accordingly, the display device 100 may not display an image before the power-on time point T_PWR_ON.

When the power-on signal PWR_ON is activated at the power-on time point T_PWR_ON, the gate control signal GCS, the data voltage VDATA, and the pixel power voltage VPP may sequentially have the normal voltage level in response to the power-on signal PWR_ON. Accordingly, the display device 100 may display an image after the power-on time point T_PWR_ON.

At a first time point TM1 after the power-on time point T_PWR_ON, the gate control signal GCS may have the normal voltage level. Further, at the first time point TM1, the gate power voltage VSS may have the normal voltage level. The controller 160 may provide the gate control signal GCS having the normal voltage level to the gate driver 120 in response to the activated power-on signal PWR_ON. Further, the controller 160 may provide the power voltage control signal PCS to the power voltage generator 150 in response to the activated power-on signal PWR_ON. The power voltage generator 150 may provide the gate power voltage VSS having the normal voltage level to the gate driver 120 based on the power voltage control signal PCS.

At a second time point TM2 after the first time point TM1, the data voltage VDATA may have the normal voltage level. The controller 160 may provide the data control signal DCS to the data driver 130 in response to the activated power-on signal PWR_ON. The data driver 130 may provide the data voltage VDATA having the normal voltage level to each of the pixels PX based on the data control signal DCS.

At a third time point TM3 after the second time point TM2, the second power voltage ELVSS may have the normal voltage level. The controller 160 may provide the power voltage control signal PCS to the power voltage generator 150 in response to the activated power-on signal PWR_ON. The power voltage generator 150 may provide the second power voltage ELVSS having the normal voltage level to the pixels PX based on the power voltage control signal PCS.

FIG. 7 illustrates an embodiment in which the normal voltage level of the second power voltage ELVSS is lower than the ground voltage level GND, however, the invention is not limited thereto. In another embodiment, the normal voltage level of the second power voltage ELVSS may be substantially equal to the ground voltage level GND.

At a fourth time point TM4 after the third time point TM3, the first power voltage ELVDD may have the normal voltage level. The controller 160 may provide the power voltage control signal PCS to the power voltage generator 150 in response to the activated power-on signal PWR_ON. The power voltage generator 150 may provide the first power voltage ELVDD having the normal voltage level to the pixels PX based on the power voltage control signal PCS.

In response to the power-on signal PWR_ON, the first power voltage ELVDD may gradually increase from the ground voltage level GND to the normal voltage level. The first power voltage ELVDD may increase to the normal voltage level after increasing to a voltage level between the ground voltage level GND and the normal voltage level in response to the power-on signal PWR_ON. In an embodiment, the first power voltage ELVDD may increase to about 24 volt (V), which is the normal voltage level, after increasing to about 12 V from the ground voltage level GND in response to the power-on signal PWR_ON, for example.

FIG. 7 illustrates an embodiment in which the voltage level of the first power voltage ELVDD increases in two steps in response to the power-on signal PWR_ON, however, the invention is not limited thereto. In another embodiment, the voltage level of the first power voltage ELVDD may increase in three or more steps in response to the power-on signal PWR_ON.

The normal voltage level of the first power voltage ELVDD may be relatively high for driving the light-emitting element LD (refer to FIG. 2), and accordingly, a surge current may occur when the first power voltage ELVDD increases from the ground voltage level GND to the normal voltage level at once in response to the power-on signal PWR_ON. However, in the embodiment of the invention, the first power voltage ELVDD may gradually increase from the ground voltage level GND to the normal voltage level in response to the power-on signal PWR_ON, so that the surge current may not occur.

Figure 8:
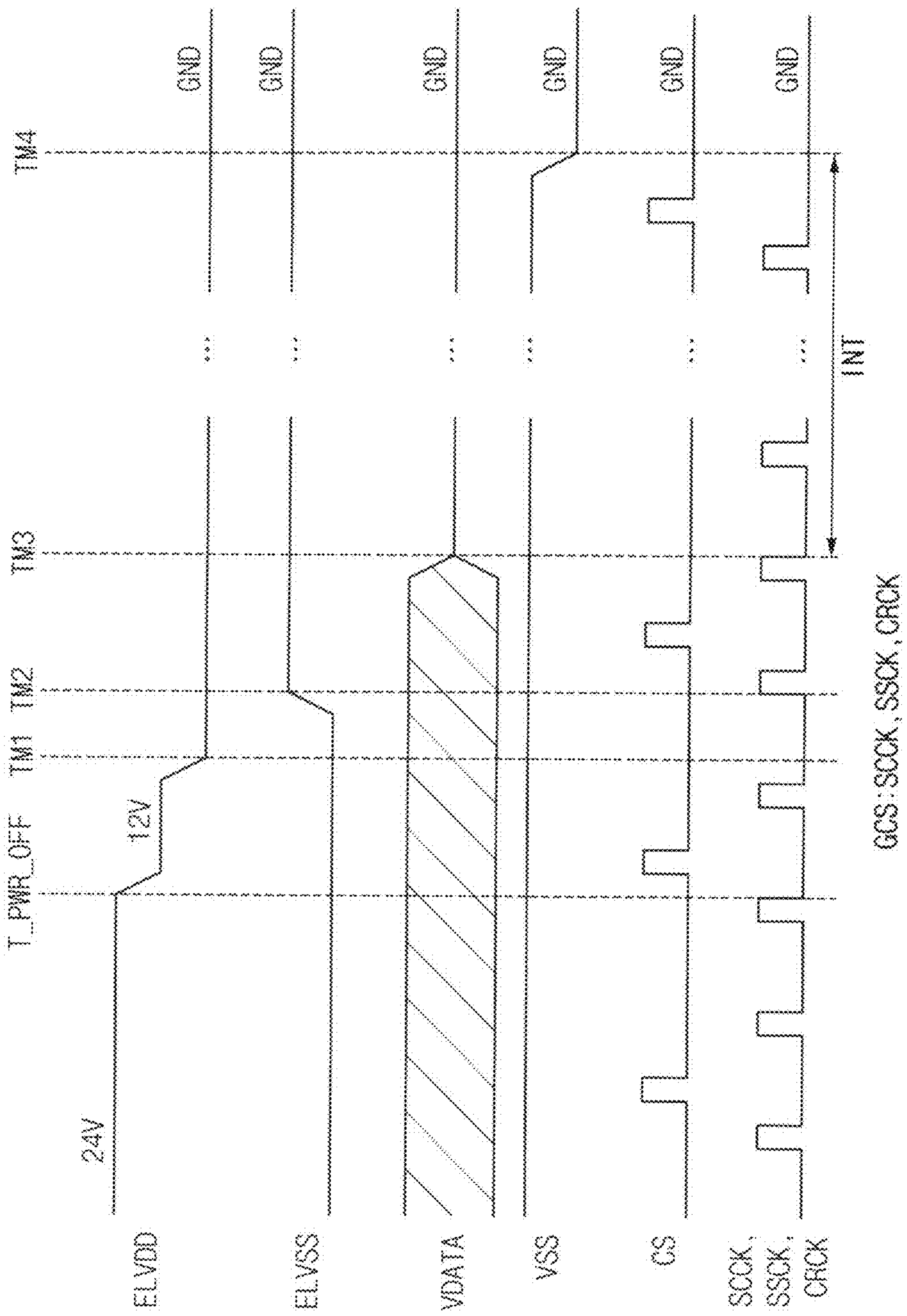
FIG. 8 is a waveform diagram illustrating an embodiment of signals and voltages before and after power-off.

FIG. 8 is a waveform diagram illustrating an embodiment of signals and voltages before and after power-off.

Referring to FIGS. 1 and 8, the pixel power voltage VPP including the first power voltage ELVDD and the second power voltage ELVSS, the data voltage VDATA, and the gate control signal GCS including the clock signals SCCK1-SCCK6, SSCK1-SSCK6, and CRCK1-CRCK6 and the control signals CS1-CS6 may sequentially have the ground voltage level GND in response to the power-off signal PWR_OFF at a power-off time point T_PWR_OFF. Further, the gate control signal GCS and the gate power voltage VSS may substantially simultaneously have the ground voltage level GND in response to the power-off signal PWR_OFF at the power-off time point T_PWR_OFF.

In an embodiment, after the first power voltage ELVDD has the ground voltage level GND in response to the power-off signal PWR_OFF, the second power voltage ELVSS may have the ground voltage level GND. In such an embodiment, the first power voltage ELVDD, the second power voltage ELVSS, the data voltage VDATA, and the gate control signal GCS may sequentially have the ground voltage level GND in response to the power-off signal PWR_OFF. In another embodiment, the first power voltage ELVDD and the second power voltage ELVSS may substantially simultaneously have the ground voltage level GND in response to the power-off signal PWR_OFF.

Before the power-off time point T_PWR_OFF, the gate control signal GCS, the gate power voltage VSS, the data voltage VDATA, and the pixel power voltage VPP may have the normal voltage level. Accordingly, the display device 100 may display an image before the power-off time point T_PWR_OFF.

When the power-off signal PWR_OFF is activated at the power-off time point T_PWR_OFF, the pixel power voltage VPP, the data voltage VDATA, and the gate control signal GCS may sequentially have the ground voltage level GND in response to the power-off signal PWR_OFF. Accordingly, the display device 100 may not display an image after the power-off time point T_PWR_OFF.

At a first time point TM1 after the power-off time point T_PWR_OFF, the first power voltage ELVDD may have the ground voltage level GND. The controller 160 may provide the power voltage control signal PCS to the power voltage generator 150 in response to the activated power-off signal PWR_OFF. The power voltage generator 150 may provide the first power voltage ELVDD having the ground voltage level GND to the pixels PX based on the power voltage control signal PCS.

In response to the power-off signal PWR_OFF, the first power voltage ELVDD may gradually decrease from the normal voltage level to the ground voltage level GND. The first power voltage ELVDD may decrease to the ground voltage level GND after decreasing to a voltage level between the normal voltage level and the ground voltage level GND in response to the power-off signal PWR_OFF. In an embodiment, the first power voltage ELVDD may decrease to the ground voltage level GND after decreasing from about 24 V, which is the normal voltage level, to about 12 V in response to the power-off signal PWR_OFF, for example.

FIG. 8 illustrates an embodiment in which the voltage level of the first power voltage ELVDD decreases in two steps in response to the power-off signal PWR_OFF, however, the invention is not limited thereto. In another embodiment, the voltage level of the first power voltage ELVDD may decrease in three or more steps in response to the power-off signal PWR_OFF.

At a second time point TM2 after the first time point TM1, the second power voltage ELVSS may have the ground voltage level GND. The controller 160 may provide the power voltage control signal PCS to the power voltage generator 150 in response to the activated power-off signal PWR_OFF. The power voltage generator 150 may provide the second power voltage ELVSS having the ground voltage level GND to the pixels PX based on the power voltage control signal PCS.

FIG. 8 illustrates an embodiment in which the normal voltage level of the second power voltage ELVSS is lower than the ground voltage level GND, however, the invention is not limited thereto. In another embodiment, the normal voltage level of the second power voltage ELVSS may be substantially equal to the ground voltage level GND.

The pixel power voltage VPP, which affects light emission of the light-emitting elements LD (refer to FIG. 2) included in the pixels PX (refer to FIGS. 1 and 2), may have the ground voltage level GND firstly, so that the light-emitting elements LD may not emit light after the power-off time point T_PWR_OFF.

At a third time point TM3 after the second time point TM2, the data voltage VDATA may have the ground voltage level GND. The controller 160 may provide the data control signal DCS (refer to FIG. 1) to the data driver 130 in response to the activated power-off signal PWR_OFF. The data driver 130 may provide the data voltage VDATA having the ground voltage level GND to each of the pixels PX based on the data control signal DCS.

At a fourth time point TM4 after the third time point TM3, the gate control signal GCS (refer to FIG. 1) may have the ground voltage level GND. Further, at the fourth time point TM4, the gate power voltage VSS may have the ground voltage level GND. The controller 160 may provide the gate control signal GCS having the ground voltage level GND to the gate driver 120 in response to the activated power-off signal PWR_OFF. Further, the controller 160 may provide the power voltage control signal PCS to the power voltage generator 150 in response to the activated power-off signal PWR_OFF. The power voltage generator 150 may provide the gate power voltage VSS having the ground voltage level GND to the gate driver 120 based on the power voltage control signal PCS.

A time interval INT between the third time point TM3 at which the data voltage VDATA has the ground voltage level GND and the fourth time point TM4 at which the gate control signal GCS and the gate power voltage VSS have the ground voltage level GND may be at least one frame time. The gate control signal GCS and the gate power voltage VSS having the normal voltage level may be provided to the gate driver 120 for at least one frame time between the third time point TM3 and the fourth time point TM4, so that the gate driver 120 may normally provide the gate signal GS to the pixels PX, and charges of the storage capacitor CST included in the pixels PX may be discharged during the frame time such that a voltage between the gate electrode and the first electrode of each of the first transistor T1 included in the pixels PX may be about 0 V. Accordingly, a display defect in which the light-emitting elements LD emit light by turning on the first transistors T1 after the power-off may not occur.

Figure 9:
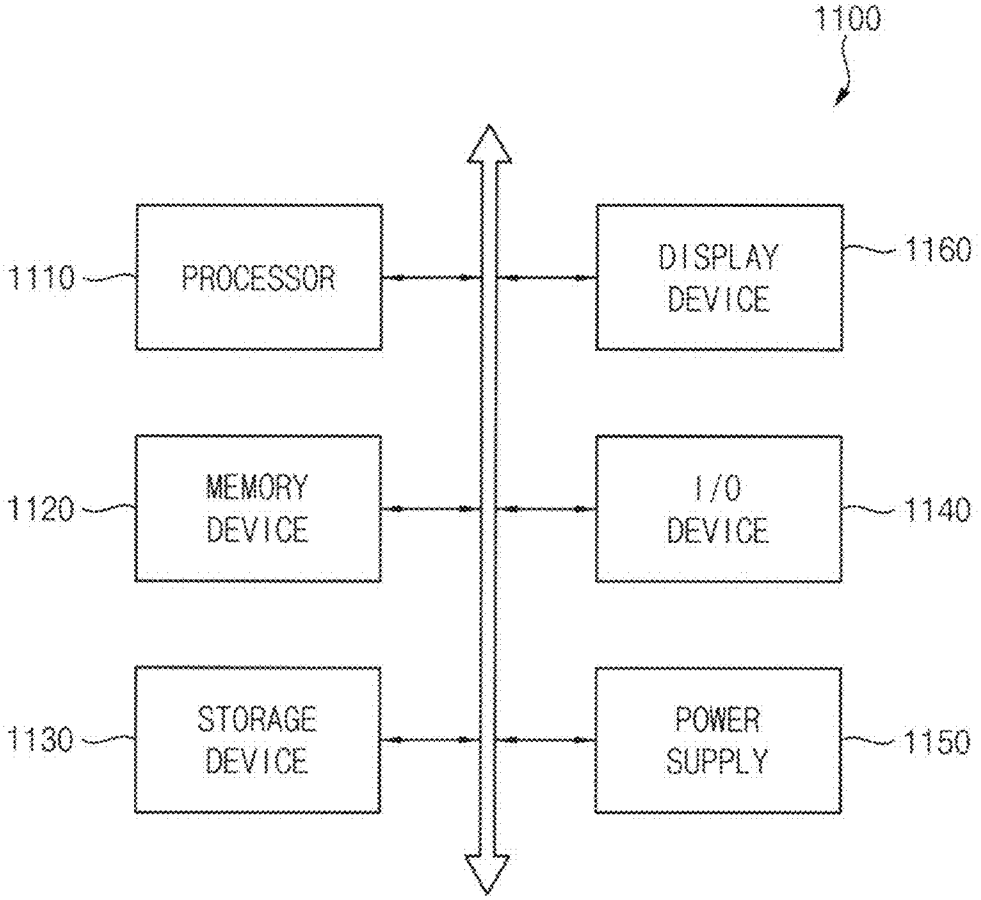
FIG. 9 is a block diagram illustrating an embodiment of an electronic apparatus including a display device.

FIG. 9 is a block diagram illustrating an embodiment of an electronic apparatus 1100 including a display device 1160.

Referring to FIG. 9, the electronic apparatus 1100 may include a processor 1110, a memory device 1120, a storage device 1130, an input/output ("I/O") device 1140, a power supply 1150, and a display device 1160. The electronic apparatus 1100 may further include a plurality of ports for communicating with a video card, a sound card, a memory card, a universal serial bus ("USB") device, etc.

The processor 1110 may perform particular calculations or tasks. In an embodiment, the processor 1110 may be a microprocessor, a central processing unit ("CPU"), or the like. The processor 1110 may be coupled to other components via an address bus, a control bus, a data bus, or the like. In an embodiment, the processor 1110 may be coupled to an extended bus such as a peripheral component interconnection ("PCI") bus.

The memory device 1120 may store data for operations of the electronic apparatus 1100. In an embodiment, the memory device 1120 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 1130 may include a solid state drive ("SSD") device, a hard disk drive ("HDD") device, a compact disc read-only memory ("CD-ROM") device, or the like. The I/O device 1140 may include an input device such as a keyboard, a keypad, a touchpad, a touch-screen, a mouse device, etc., and an output device such as a speaker, a printer, etc. The power supply 1150 may supply a power desired for the operation of the electronic apparatus 1100. The display device 1160 may be coupled to other components via the buses or other communication links.

In the display device 1160, the pixel power voltage, the data voltage, and the gate control signal may sequentially have the ground voltage level in response to the power-off signal, so that an unpredicted image may not be displayed after the power-off. Further, the gate control signal and the data voltage may substantially simultaneously have the ground voltage level in response to the shutdown signal, so that an unpredicted image may not be displayed after the shutdown.

The display device in the embodiments may be applied to a display device included in a computer, a notebook, a mobile phone, a smart phone, a smart pad, a portable media player ("PMP"), a personal digital assistant ("PDA"), an MP3 player, or the like.

Although the display devices and the methods of driving the display devices in the embodiments have been described with reference to the drawings, the illustrated embodiments are examples, and may be modified and changed by a person having ordinary knowledge in the relevant technical field without departing from the technical spirit described in the following claims.

What is claimed is:

1. A display device, comprising:

a display panel including a plurality of pixels;

a gate driver which provides a gate signal to corresponding pixels of the plurality of pixels;

a data driver which provides a data voltage to the corresponding pixels of the plurality of pixels;

a power voltage generator which provides a pixel power voltage to each of the plurality of pixels, and provides a gate power voltage to the gate driver; and a controller which provides a gate control signal to the gate driver, wherein the pixel power voltage, the data voltage, and the gate control signal sequentially have a ground voltage level in response to a power-off signal so that a scan clock signal, a sensing clock signal and a carry clock signal of the gate control signal only have the ground voltage level after the data voltage has the ground voltage level.

2. The display device of claim 1, wherein the pixel power voltage includes a first power voltage and a second power voltage having a voltage level lower than a voltage level of the first power voltage after a power-on, and wherein the second power voltage has the ground voltage level after the first power voltage has the ground voltage level in response to the power-off signal.

3. The display device of claim 2, wherein the first power voltage gradually decreases from a normal voltage level to the ground voltage level in response to the power-off signal.

4. The display device of claim 3, wherein the first power voltage decreases to the ground voltage level after the first power voltage decreases to a voltage level between the normal voltage level and the ground voltage level in response to the power-off signal.

5. The display device of claim 1, wherein a time interval between a time point at which the data voltage has the ground voltage level and a time point at which the gate control signal has the ground voltage level is at least one frame time.

6. The display device of claim 1, wherein the gate control signal and the gate power voltage substantially simultaneously have the ground voltage level in response to the power-off signal.

7. The display device of claim 1, wherein the gate control signal, the data voltage, and the pixel power voltage sequentially have a normal voltage level in response to a power-on signal.

8. The display device of claim 7, wherein the pixel power voltage includes a first power voltage and a second power voltage having a voltage level lower than a voltage level of the first power voltage after a power-on, and wherein the first power voltage has the normal voltage level after the second power voltage has the normal voltage level in response to the power-on signal.

9. The display device of claim 8, wherein the first power voltage gradually increases from the ground voltage level to the normal voltage level in response to the power-on signal.

10. The display device of claim 9, wherein the first power voltage increases to the normal voltage level after the first power voltage increases to a voltage level between the ground voltage level and the normal voltage level in response to the power-on signal.

11. The display device of claim 1, wherein the gate control signal and the data voltage substantially simultaneously have the ground voltage level in response to a shutdown signal.

12. The display device of claim 11, wherein the gate control signal, the data voltage, and the gate power voltage substantially simultaneously have the ground voltage level in response to the shutdown signal.

13. The display device of claim 1, wherein the gate control signal includes a plurality of clock signals and a plurality of control signals.

14. The display device of claim 1, wherein the gate power voltage includes a plurality of power voltages.

15. A method of driving a display device, the method comprising:

controlling a pixel power voltage provided to a plurality of pixels from a power voltage generator to have a ground voltage level in response to a power-off signal;

controlling a data voltage provided to corresponding pixels of the plurality of pixels from a data driver to have the ground voltage level after the pixel power voltage has the ground voltage level; and controlling a scan clock signal, a sensing clock signal and a carry clock signal of a gate control signal provided to a gate driver from a controller to only have the ground voltage level after the data voltage has the ground voltage level.

16. The method of claim 15, wherein the pixel power voltage includes a first power voltage and a second power voltage having a voltage level lower than a voltage level of the first power voltage after a power-on, and wherein the controlling the pixel power voltage to have the ground voltage level includes:

controlling the first power voltage to have the ground voltage level in response to the power-off signal; and controlling the second power voltage to have the ground voltage level after the first power voltage has the ground voltage level.

17. The method of claim 16, wherein the first power voltage gradually decreases from a normal voltage level to the ground voltage level in response to the power-off signal.

18. The method of claim 15, wherein a time interval between a time point at which the data voltage has the ground voltage level and a time point at which the gate control signal has the ground voltage level is at least one frame time.

19. The method of claim 15, further comprising:

controlling the gate control signal to have a normal voltage level in response to a power-on signal;

controlling the data voltage to have the normal voltage level after the gate control signal has the normal voltage level; and controlling the pixel power voltage to have the normal voltage level after the data voltage has the normal voltage level.

20. The method of claim 15, further comprising:

controlling the gate control signal and the data voltage to substantially simultaneously have the ground voltage level in response to a shutdown signal.

* * * * *